June 20, 1961  E. R. GODFREY  2,988,900
COOLING UNIT FOR DRY CLEANING PLANT
Filed Nov. 6, 1958
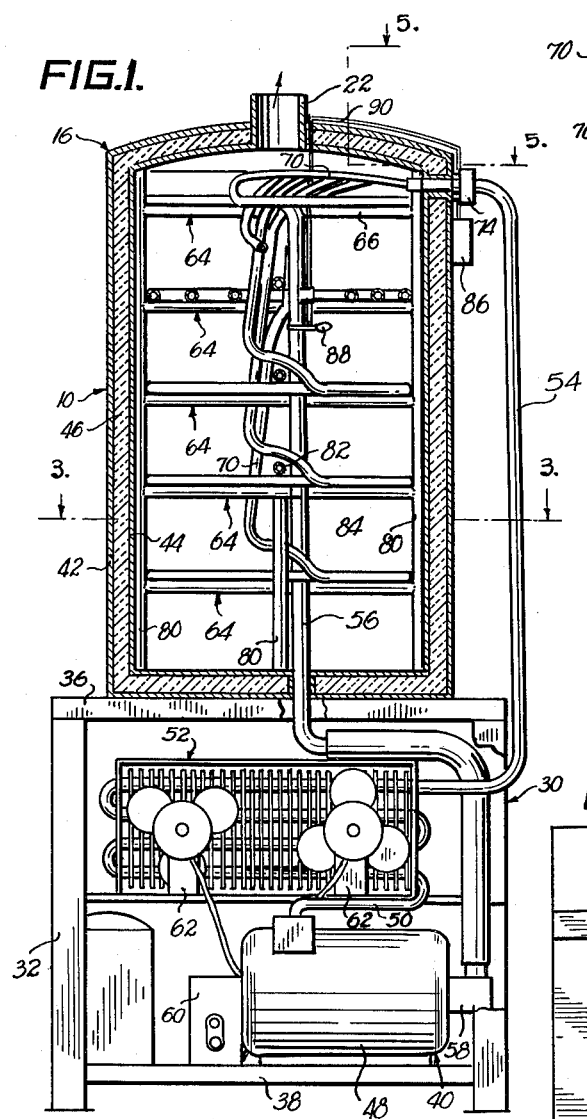
INVENTOR.
Ernest R. Godfrey
BY
ATTORNEY.

United States Patent Office 2,988,900
Patented June 20, 1961

2,988,900
COOLING UNIT FOR DRY CLEANING PLANT
Ernest R. Godfrey, Rogers, Ark., assignor to Rite-Temp Manufacturing Company, Rogers, Ark., a corporation of Arkansas
Filed Nov. 6, 1958, Ser. No. 772,360
5 Claims. (Cl. 62—394)

This invention relates to apparatus for cooling a liquid at an elevated temperature and has for its primary object to provide an assembly capable of cooling the liquid as the same flows through a supply line and particularly liquids of the type commonly employed in dry cleaning plants and which may thereby be a relatively volatile solvent or water.

It is a further important object of the invention to provide apparatus for cooling a liquid at an elevated temperature and as the same flows through a supply line, including a refrigeration unit having a plurality of components disposed within a tank through which the liquid is caused to flow and capable of extracting substantially equal quantities of heat simultaneously from a plurality of spaced areas of such liquid as the same flows continuously through the tank.

Also an important object of the invention is to provide apparatus as referred to above having an elongated tank interposed in the liquid supply line in a position causing the liquid to flow in a direction extending longitudinally of the tank and with the heat extraction components located in transversely extending, longitudinally spaced relationship within the tank to obtain maximum cooling of the liquid flowing through the tank, notwithstanding the fact that such liquid is caused to flow at a relatively high volume rate.

A still further important object of the invention is to provide apparatus wherein the heat extraction components comprise a plurality of coiled heat exchangers each individually connected to the coolant supply conduit from the refrigeration unit, to the end that coolant at substantially the same temperature is directed substantially simultaneously to all of the coiled heat exchangers, thereby producing very efficient cooling of the liquid as the same passes through the elongated tank defined above.

Another important object of the invention is to provide novel header means for distributing the liquid coolant from the refrigeration unit supply conduit to each of the coiled heat exchangers and having an orifice in the header for each of the coiled heat exchangers respectively communicating each of the latter with the coolant conduit, whereby such orifices operate as individual expansion valves for each of the coiled heat exchangers to assure passage of coolant to the heat exchangers at the same temperature and in the same condition, thereby materially increasing the cooling capacity of the instant apparatus.

Other important objects of the invention relate to the provision of a thermocouple connected to the tank for controlling operation of the refrigeration unit in response to the temperature of the liquid passing through the tank; to the provision of apparatus for cooling a liquid at an elevated temperature and as the same flows through a supply line which is relatively simple in construction, may be manufactured from readily obtainable materials in a minimum of time, and which is compact in design to permit installation of the same in close proximity to the unit utilizing the liquid required to be cooled; and to other important objects and details of construction which will become obvious or be explained more fully in detail as the following specification progresses.

In the drawing:

FIGURE 1 is an end view of apparatus embodying the concepts of the instant invention and adapted for cooling a liquid as the same flows through a supply line, the tank and certain components disposed therein being in section to reveal details of construction and other parts being broken away to show the elements behind the same;

FIG. 2 is a greatly reduced, side elevational view of the apparatus shown in FIG. 1;

FIG. 3 is a fragmentary, horizontal, cross-sectional view taken substantially on the line 3—3 of FIG. 1 and looking downwardly in the direction of the arrows;

FIG. 4 is a schematic flow diagram illustrating the way in which the instant apparatus is connected in a liquid supply line; and FIG. 5 is a horizontal, fragmentary, cross-sectional view taken on the line 5—5 of FIG. 1 and also looking downwardly in the direction of the arrows.

Apparatus broadly designated 10 and illustrated in the drawing in its preferred form is particularly adapted for cooling a liquid at an elevated temperature and as the same flows through a supply line generally numerated 12 connected to a washer 14. Apparatus 10 is of especial utility in lowering the temperature of a liquid normally employed to clean clothing or the like in a dry cleaning plant and which, therefore, may comprise either a volatile solvent of the chlorinated hydrocarbon type or water.

The inlet 17 of tank 16 forming a part of cooling apparatus 10 is coupled with conduit 18, in turn connected to the outlet 20 of washer 14. Similarly, the outlet 22 of tank 16 intercommunicates cooling apparatus 10 with the inlet 24 of washer 14 through provision of a return pipe 26 constituting a portion of line 12. In most instances, it has been found desirable to employ a filter 28 in liquid conduit 18 to remove foreign materials from the hot liquid prior to its entrance into tank 16 of cooling apparatus 10.

The temperature of the liquid entering tank 16 through inlet 17 thereof will vary, depending upon the type of liquid employed in washer 14 and also the ambient atmospheric condition in the building in which washer 14 and cooling apparatus 10 are housed. However, for most purposes it is desirable that the temperature of the liquid emanating from washer 14 through conduit 18 be reduced to approximately 75° F. to 80° F. within cooling apparatus 10 in order that such liquid will not deleteriously affect the clothing being cleaned in washer 14, this being particularly important when solvents in the nature of chlorinated hydrocarbons are utilized. It has been found that solvents of this type tend to promote bleeding of dyes (especially on acetate) when too hot and oftentimes unduly wrinkle the clothing, making finishing difficult and costly. Furthermore, volatile solvents are a definite fire hazard at elevated temperatures, since many of the commonly utilized liquids have a flash point as low as 100° F.

Cooling apparatus 10 for lowering the temperature of the liquid employed in washer 14 to a desired level comprises a base 30 including a plurality of upright legs 32 supporting a pair of horizontal end members 34 interconnected by a pair of parallel, more closely spaced crossbars 36 spanning the distance between members 34 and welded to the latter. A horizontal shelf 38 joined to legs 32 at the lower ends thereof serves as a support for a refrigeration unit broadly numerated 40.

Tank 16, mounted on and supported by crossbars 36 of base 30, includes an elongated, upright, outer tank shell 42 and an inner, complemental tank shell 44 maintained in spaced relationship to shell 42 and separated from the latter by a layer of insulation 46. Inlet 17 of tank 16 passes through inner and outer shells 42 and 44 adjacent the lower end of tank 16, while outlet 22 projects upwardly from shells 42 and 44 and communicates with the interior of the latter.

Refrigeration unit 40 is conventional in construction in that the same includes a coolant compressor 48 provided with a line 50 coupled to condenser assembly 52, as well as a coolant supply conduit 54 leading from condenser 52 and a coolant return pipe 56 extending upwardly through the central area of tank 16 and communicating with the inlet 58 of compressor 48. Switch 60, electrically connected to the sealed motor of compressor 48 as well as fans 62 directed toward condenser assembly 52, permits manual control of operation of refrigeration unit 40.

A plurality of heat exchangers broadly numerated 64 are mounted within inner shell 44 in transversely extending, longitudinally spaced relationship as best shown in FIG. 1. Each of the heat exchangers 64 comprises an elongated tube 66 in coiled configuration, as illustrated in FIG. 3, with the inner end 68 thereof coupled with coolant return pipe 56, while an outer portion 70 of each of the tubes 66 extends upwardly from a respective coil 64 and is joined to a header 72, in turn connected to and communicating with a coupling 74 on the uppermost end of coolant supply conduit 54. It is to be pointed out that tubular section 76 of header 72 extends through shells 42 and 44 of tank 16 adjacent the upper end of the latter, whereby header 72 is in proximity to outlet 22 and therefore, remote from inlet 17. The uppermost ends 78 of each of the portions 70 of tubes 66 are connected to headers 72 in substantially parallel relationship, as shown in FIG. 5, and header 72 is provided with a restricted orifice for each of the ends 78 and communicating with respective portions 70 of tubes 66. The orifices referred to above serve as expansion valves to regulate flow of coolant from conduit 54 into each of the heat exchangers 64.

A plurality of uprights 80 joined to all of the heat exchangers 64 adjacent the outer margins thereof maintain the same in proper, transversely extending, longitudinally spaced relationship, while a pair of crossed members 82 and 84 connected to each heat exchanger 64 maintain the coils thereof in a substantially common plane. The outermost ends of cross members 82 and 84 are joined to respective uprights 80 to present a relatively rigid heat exchange assembly within the interior of shell 44.

A thermocouple 86 mounted on the exterior of tank 16 includes a heat sensitive element 88 positioned within shell 44 and operably coupled with thermocouple 86 by a line 90, while thermocouple 86 is also electrically connected to refrigeration unit 40 to control operation of the same in response to change in temperature as sensed by element 88.

In operation, it can be seen that liquid to be cooled is directed into inlet 17 of tank 16 by conduit 18 coupled with the outlet 20 of washer 14, whereby the liquid at an elevated temperature is caused to flow upwardly through inner shell 44 of tank 16 and thence outwardly through outlet 22 into pipe 26 for conveyance to washer 14 via inlet 24. The foreign materials in the hot liquid emanating from washer 14 are removed by filter 28.

Assuming that refrigeration unit 40 is in operation, coolant vapor compressed by compressor 48 is directed through condenser assembly 52, whereby such vapor is condensed to a liquid by fans 62 blowing cooling currents of air across the heat exchange fins of assembly 52 and liquid coolant is thereby directed upwardly within supply conduit 54 to coupling 74. The coolant passes from coupling 74 into headers 72 whereby such coolant is simultaneously conveyed into portions 70 of each of the tubes 66 through the restricted orifices adjacent corresponding ends 78 of each heat exchanger 64 and constituting expansion valves as outlined above. The coolant passes into the main portions of each of the tubes 66 via portions 70, whereupon thermal energy from the liquid passing through tank 16 is absorbed by the coolant and the latter is vaporized prior to passage of the same into return pipe 56 via outlet ends 68 of each of the tubes 66. Return pipe 56 directs the coolant vapor into compressor 48 for recycling of the same in the manner described above.

It is to be pointed out that very efficient cooling of the liquid flowing through tank 16 is effected through utilization of a plurality of heat exchangers 64 disposed in transversely extending, longitudinally spaced relationship within shell 44 by virtue of the fact that each of the heat exchangers 64 is capable of removing substantially equal quantities of thermal energy from the liquid and which would not be the case if the coolant was passed through each of the heat exchangers 64 in series relationship. The parallel connection of each of the heat exchangers 64 to coolant supply conduit 54 materially increases the efficiency of cooling apparatus 10 and permits cooling of relatively large quantities of liquid from washer 14 with a cooling unit 40 of minimum size. This permits construction of apparatus relatively small in size in comparison with its cooling capacity and permits installation of apparatus 10 in close proximity to washer 14 without extensive modification of the cleaning plant building being required.

Provision of thermocouple 86 is of importance because the same maintains the temperature of the liquid emanating from outlet 22 at a substantially constant level and controls operation of refrigeration unit 40 in response to the temperature of the liquid passing through tank 16.

Cooling apparatus 10 may be installed by the cleaning plant operator without special tools being required, and with it only being necessary for washer 14 to be shut down for a limited period.

Although the preferred construction has been illustrated in the drawing, it can be appreciated that various modifications in the instant apparatus may be made without departing from the spirit of the invention. For example, the configuration of tubes 66 may be changed so that the same present rectangles, although the coil shape shown is preferred because the same presents maximum liquid contact area within the space provided to assure efficient thermal interchange between the liquid flowing through tank 16 and the coolant in heat exchangers 64. It is therefore intended to be limited only by the scope of the appended claims.

Having thus described the invention what is claimed as new and desired to be secured by Letters Patent is:

1. Apparatus for cooling a liquid at an elevated temperature and as the same flows through a supply line, said apparatus including an elongated tank provided with an inlet and an outlet at substantially opposed ends thereof adapted to be coupled to respective lengths of said supply line to cause all of the liquid to have a flow path in one longitudinally extending direction through the tank from said inlet to said outlet; a refrigeration unit provided with a fluid coolant supply conduit and a coolant return pipe; a plurality of planar, coiled heat exchangers mounted within the tank in longitudinally spaced relationship and extending transversely to said tank and said flow path, said exchangers being capable of simultaneously removing substantially equal quantities of heat from said liquid as the latter flows successively thereover; and header means individually connecting each of the heat exchangers to said conduit, said return pipe extending through the heat exchangers and connected to each of the latter.

2. Apparatus as set forth in claim 1, wherein each of said heat exchangers comprises an elongated tube in coiled configuration and lying in a substantially common plane, one end of each tube being coupled with said header means and the opposite end of each tube being connected to said return pipe.

3. Apparatus as set forth in claim 2, wherein said header means has a restricted orifice therein for each of the heat exchangers respectively and intercommunicating corresponding tubes and the coolant supply conduit.

4. Apparatus as set forth in claim 1 wherein is provided thermocouple means including a heat sensitive element within the tank and switch mechanism coupled to the element and said unit for controlling operation of the latter in response to temperature changes detected by said element.

5. Apparatus as set forth in claim 2, wherein said opposite end of each of the tubes is disposed in the innermost area of a respective coil and connected to the return pipe passing through said area, said one end of each tube including an elongated stretch extending from the outermost margin of each coil to said header means.

References Cited in the file of this patent

UNITED STATES PATENTS

| | | |
|---|---|---|
| 1,975,046 | Larkin | Sept. 25, 1934 |
| 2,762,209 | Bennett | Sept. 11, 1956 |
| 2,792,690 | Flynn | May 21, 1957 |